(12) United States Patent
Detournay et al.

(10) Patent No.: US 8,784,756 B2
(45) Date of Patent: Jul. 22, 2014

(54) PROCESS FOR THE JOINT PRODUCTION OF SODIUM CARBONATE AND SODIUM BICARBONATE

(75) Inventors: Jean-Paul Detournay, Brussels (BE); Francis M. Coustry, Alsemberg (BE); Perrine Davoine, Brussels (BE)

(73) Assignee: Solvay SA, Brussels (BE)

( * ) Notice: Subject to any disclaimer, the term of this patent is extended or adjusted under 35 U.S.C. 154(b) by 0 days.

(21) Appl. No.: 13/139,430

(22) PCT Filed: Dec. 22, 2009

(86) PCT No.: PCT/EP2009/067813
§ 371 (c)(1),
(2), (4) Date: Jun. 13, 2011

(87) PCT Pub. No.: WO2010/072793
PCT Pub. Date: Jul. 1, 2010

(65) Prior Publication Data
US 2011/0250109 A1    Oct. 13, 2011

(30) Foreign Application Priority Data
Dec. 22, 2008 (EP) .................................. 08172562

(51) Int. Cl.
*C01D 1/32*          (2006.01)
(52) U.S. Cl.
USPC ........ 423/186; 423/209; 423/206.2; 423/205; 423/165
(58) Field of Classification Search
USPC ........................................................... 423/186
See application file for complete search history.

(56) References Cited

U.S. PATENT DOCUMENTS

| | | |
|---|---|---|
| 3,264,057 A | 8/1966 | Miller |
| 4,238,305 A | 12/1980 | Gancy et al. |
| 4,584,077 A | 4/1986 | Chlanda et al. |
| 4,654,204 A | 3/1987 | Copenhafer et al. |
| 5,624,647 A * | 4/1997 | Zolotoochin et al. ...... 423/206.2 |
| 5,736,113 A | 4/1998 | Hazen et al. |
| 6,010,672 A | 1/2000 | Turner |
| 6,924,318 B2 | 8/2005 | Mischi et al. |
| 2003/0017099 A1 | 1/2003 | Kurtz |
| 2009/0291038 A1* | 11/2009 | Davoine et al. ............ 423/206.2 |

FOREIGN PATENT DOCUMENTS

| | | |
|---|---|---|
| EP | 1876145 A1 | 1/2008 |
| GB | 2106488 A | 4/1983 |
| WO | WO 0179335 A1 | 10/2001 |

(Continued)

OTHER PUBLICATIONS

Unknown Author, Official Monograph for Sodium Bicarbonate, in *U.S. Pharmacopeia*, 24th edition (2001), pp. 1525-1527 (3 pgs.).

*Primary Examiner* — Melissa Stalder
(74) *Attorney, Agent, or Firm* — Beatrice C. Ortego

(57) ABSTRACT

A process for the joint production of sodium carbonate and sodium bicarbonate out of trona, comprising: introducing and dissolving crushed trona ore in a leaching tank containing a solution comprising sodium carbonate and sodium bicarbonate, saturated in sodium bicarbonate, in order to produce solid particles suspended in a production solution comprising sodium carbonate, the solid particles containing insoluble impurities and at least 65% in weight of sodium bicarbonate; separating the solid particles from the production solution containing sodium carbonate; drying and valorizing the separated solid particles; taking at least part of the production solution containing sodium carbonate out of the leaching tank in order to constitute a produced solution which is valorized; and introducing water in the leaching tank.

16 Claims, 3 Drawing Sheets

(56) References Cited

FOREIGN PATENT DOCUMENTS

| WO | WO 2006053873 A1 | 5/2006 |
| WO | WO 2008003787 A1 | 1/2008 |
| WO | WO 2009087145 A1 | 7/2009 |
| WO | WO 2009087149 A1 | 7/2009 |
| WO | WO 2011161120 A1 | 12/2011 |

* cited by examiner

PROCESS FOR THE JOINT PRODUCTION OF SODIUM CARBONATE AND SODIUM BICARBONATE

CROSS-REFERENCE TO RELATED APPLICATIONS

The present application is a U.S. national stage entry under 35 U.S.C. §371 of International Application No. PCT/EP2009/067813 filed Dec. 22, 2009, which claims the priority benefit of European Patent application No. 08172562.4, filed on Dec. 22, 2008, this application being herein incorporated by reference in its entirety for all purposes.

This invention relates to a method for the joint production of sodium carbonate and sodium bicarbonate out of trona ore.

Trona ore is a mineral that contains about 90-95% sodium sesquicarbonate ($Na_2CO_3.NaHCO_3.2H_2O$). A vast deposit of mineral trona is found in southwestern Wyoming near Green River. This deposit includes beds of trona and mixed trona and halite (rock salt or NaCl) which covers approximately 2,600 km². The major trona beds range in size from less than 428 km² to at least 1,870 km². By conservative estimates, these major trona beds contain about 75 billion metric tons of ore. The different beds overlap each other and are separated by layers of shale. The quality of the trona varies depending on its particular location in the stratum.

A typical analysis of the trona ore mined in Green River is as follows:

TABLE 1

| Constituent | Weight Percent |
| --- | --- |
| $Na_2CO_3$ | 43.6 |
| $NaHCO_3$ | 34.5 |
| $H_2O$ (crystalline and free moisture) | 15.4 |
| NaCl | 0.01 |
| $Na_2SO_4$ | 0.01 |
| $Fe_2O_3$ | 0.14 |
| Insolubles | 6.3 |

The sodium sesquicarbonate found in trona ore is a complex salt that is soluble in water and dissolves to yield approximately 5 parts by weight sodium carbonate ($Na_2CO_3$) and 4 parts sodium bicarbonate ($NaHCO_3$), as shown in the above analysis. The trona ore is processed to remove the insoluble material, the organic matter and other impurities to recover the valuable alkali contained in the trona.

The most valuable alkali produced from trona is sodium carbonate. Sodium carbonate is one of the largest volume alkali commodities made in the United States. In 1992, trona-based sodium carbonate from Wyoming comprised about 90% of the total U.S. soda ash production. Sodium carbonate finds major use in the glass-making industry and for the production of baking soda, detergents and paper products.

A common method to produce sodium carbonate from trona ore is known as the "monohydrate process". In that process, crushed trona ore is calcined (i.e., heated) into crude sodium carbonate which is then dissolved in water. The resulting water solution is purified and fed to a crystallizer where pure sodium carbonate monohydrate crystals are crystallized. The monohydrate crystals are separated from the mother liquor and then dried into anhydrous sodium carbonate. However, the soluble impurities contained in the trona ore, tend to accumulate into the crystallizer. To avoid build up of impurities, the mother liquor must be purged. The purge liquor, which represents important quantities for industrial monohydrate plants, is commonly sent to evaporative ponds. The significant quantity of alkali which is contained in the purge liquor is consequently lost. Moreover, the stocking of large quantities of purge liquors in evaporative ponds raise environmental problems, because of the scarce availability of new areas for stocking.

On the other side, sodium bicarbonate is a product with a wide range of interesting properties and a very wide range of applications from high tech ingredients for the pharma industry to the human food and animal feed, and to the use in flue gas treatment. In flue gas treatment sodium bicarbonate is most likely among the most efficient chemicals for the removal of a wide range of pollutants (most notably the acidic one), and its use is limited only by the competition of less efficient but much cheaper chemicals such as lime or even limestone.

The production of sodium bicarbonate is currently almost entirely made by the carbonation of sodium carbonate. In Europe, the carbonation is usually performed in situ in the soda ash plants from $CO_2$ coproduced during the production of soda ash (mainly the $CO_2$ generated in the lime kilns). In USA, the carbonation is usually made in separate plants which purchase independently the soda ash and the $CO_2$ and combine them.

Because of the nature of this most important process for the bicarbonate production, the price for bicarbonate is above the price of the soda ash. With such economics the uses of bicarbonate will always be limited by the competition of cheaper substitutes, most notably in the flue gas treatment.

US 2003/0017099 discloses a process for the joint production of sodium carbonate and bicarbonate, according to which solid trona is dissolved in water and the resulting water solution is fed into a monohydrate crystallizer in order to produce sodium carbonate. The purge liquor is introduced into a decahydrate crystallizer and the decahydrate crystals converted into sodium bicarbonate. It has been observed that this process is not efficient when the purge liquor, depending on the trona source, contains high levels of impurities. In particular, the sodium chloride content of the trona ore can vary depending on the precise trona vein which is exploited. High levels of sodium chloride in the purge liquor prevent smooth crystallisation of decahydrate.

The invention aims at producing bicarbonate from trona in a smooth and inexpensive way, thereby opening new applications for the sodium bicarbonate and at the same time valorizing the sodium carbonate contained in the trona.

Accordingly, the invention concerns a process for the separate valorization of sodium carbonate and sodium bicarbonate out of trona according to which:

Crushed trona ore is introduced and dissolved in a stirred leaching tank containing a dissolution solution which comprises sodium carbonate and sodium bicarbonate, saturated in sodium bicarbonate, in order to produce solid particles suspended in a production solution which comprises sodium carbonate, the solid particles containing insoluble impurities and at least 65% in weight of sodium bicarbonate;

The solid particles are separated from the production solution containing sodium carbonate;

The separated solid particles are dried and valorized;

At least part of the production solution containing sodium carbonate is taken out of the leaching tank in order to constitute a produced solution which is valorized;

Extraction feed water is introduced in the leaching tank.

The process according to the invention allows to valorize separately the sodium carbonate and sodium bicarbonate parts of the trona, containing sodium sesquicarbonate, thereby producing valuable materials with a minimum of energy consumption. Trona contains generally at least 10% in weight of sodium sesquicarbonate, preferably at least 50%, more preferably at least 80% of sodium sesquicarbonate. Trona contains generally at most about 99% in weight of sodium sesquicarbonate, more generally at most about 95% in weight of sodium sesquicarbonate. The process produces solid particles having a high content in sodium bicarbonate. Without being bound by a theoretical explanation, the inventors guess that those particles are probably produced in a two steps reaction. In the first step, the crushed trona ore is totally dissolved in the dissolution solution. In a second step, the solid particles containing sodium bicarbonate are formed spontaneously in the dissolution solution.

The process according to the invention can be operated either in a batch/discontinuous mode or in a continuous mode.

When it is operated in the batch discontinuous mode, the composition of the dissolution solution evolves towards the composition of the production solution, as long as the quantity of trona ore initially introduced in the leaching tank is progressively dissolved and solid particles are produced. When the dissolution is completed, the solid particles are separated and extraction water is introduced to bring the composition of the solution inside the leaching tank back to the initial composition of the dissolution solution.

When the process is operated in a continuous mode, the composition of the dissolution solution is stationary and is the same as the composition of the production solution. Extraction water and trona ore are then continuously added in the leaching tank. In an advantageous mode, when the process is operated in a continuous mode, several leaching tanks can be organized in battery which operates as follows. Extraction water and trona ore are continuously added to a first leaching tank. The outflow of the first leaching tank (production solution and solid particles) is introduced into a second leaching tank. More leaching tanks can also be used in series after the second one. Such a use of two or more leaching tanks in battery enables a better residence time distribution of the trona ore within the production solution. This improves the dissolution of trona and the corresponding selective dissolution of sodium carbonate. This improves also the solid particles production with a higher content in sodium bicarbonate.

Extraction water can be pure fresh water. In advantageous embodiments, it can also comprise sodium carbonate and/or sodium bicarbonate. Preferably the extraction water is a recycled water solution coming from other processes in the alkali plant, preferably from electrodialysis processes. It contains preferably from 10 to 35 g/kg of sodium carbonate and/or from 70 to 100 g/kg sodium bicarbonate.

In a preferred embodiment to produce coarse solid particles in the leaching tank, the weight ratio of extraction water to sodium sesquicarbonate of the trona introduced in the leaching tank is inferior or equal to 3.5. In a more preferred embodiment the weight ratio of extraction water to sodium sesquicarbonate of the trona introduced in the leaching tank is inferior or equal to 3.2.

Trona ore must be crushed down to a particle size suitable to get efficient dissolution of the trona in the dissolution solution. Crushing can for instance be performed in the trona mine, in the vicinity of the mining means or in the surface alkali plant. It is advantageously followed by sieving or any other separation means to eliminate too big or too small particles. Preferably, crushed trona ore is composed of particles having mean diameter D50 less than 5 mm. By diameter of trona particles is understood the equivalent diameter, that is the diameter of the sphere having the same surface as the particle. D50 is the diameter such that 50% in weight of the particles have a diameter less than D50. More preferably, the D50 diameter of the crushed trona particles is less than 2 mm. It is also recommended that the D50 diameter is at least 10 μm, preferably at least 20 μm. In some preferred embodiments, the D50 is more preferably at least 35 μm, most preferably at least 50 μm.

In order to speed up dissolution and get homogeneous solutions, it is important for the leaching tank to be properly stirred. The stirring can be performed by any means (mechanical, thermal, . . . ), suitable for inducing sufficient convection in the tank. Mechanical rotating means or vibrating means are preferred. In that case rotational speeds in excess of 50 rpm are recommended.

In the process according to the invention, the dissolution solution is saturated in sodium bicarbonate. When the process starts, it can happen that the solution is not yet saturated in sodium bicarbonate. In that case, when trona dissolves, it is necessary that the solution becomes as quickly as possible saturated in sodium bicarbonate, to start production of the solid particles. The concentration in sodium bicarbonate at saturation depends on the concentration of other components of the solution, mainly sodium carbonate, and on the temperature. Saturated concentrations for sodium carbonate-sodium bicarbonate solutions are given on FIG. 1.

It is recommended for the temperature of the dissolution and production solutions to be at least 20° C., preferably at least 25° C., more preferably at least 30° C. and most preferably at least 40° C., to speed up dissolution, and increase sensitively the particles size of the produced particles.

A temperature above 25° C. has shown surprisingly that the sizes of the produced particles can be usefully increased when residence time of the content of the leach tank is increased in continuous operation. As for a temperature below 25° C. increasing the residence time does not enable to increase the sizes of the produced particles. Coarser particles enable an easier separation of the produced particles from the production solution, and less energy consumption at the drying step.

Values of temperature of the dissolution and production solutions above 70° C. are not recommended because of excessive energy consumption. It is preferred that temperature of the dissolution and production solutions to be inferior or equal to 65° C., more preferred inferior or equal to 60° C., and most preferred inferior or equal to 55° C.

If a low sodium bicarbonate content in the production solution is desired, temperature values below 40° C., for instance values between 25 and 35° C., are preferred. Alternatively, if coarser sizes of solid particles are desired values above 40° C., especially those less than 55° C., are preferred.

The produced solid particles contain insoluble impurities and at least 65%, preferably 70%, more preferably 74%, most preferably at least 85% in weight sodium bicarbonate. They contain advantageously less than 15%, preferably less than 10%, most preferably less than 5% in weight of sodium carbonate.

The insoluble impurities coming from the trona ore, such as oil shales, dolomite, feldspar, quartz, clay and shortite, in contact with the production solution are released in the leaching tank, and part of them transformed into hydrated forms. These transformed insoluble particles will be called hereafter "trona insoluble impurities". They have interesting properties in combination with the high content of sodium bicarbonate of the produced solid particles.

This is particularly the case when the produced solid particles are used in treatment of a flue gas containing acid components. Such trona insoluble impurities present the benefit to inhibit the formation of incrustation in mills when the produced solid particles are milled before to be introduced into the flue gas. Moreover specific pollutants of flue gases such as fluorhydric acid are effectively neutralized with such trona insoluble impurities in combination with sodium bicarbonate.

Therefore the present invention relates also to solid particles obtainable by the process described in present description, comprising at least 65%, preferably at least 70%, and most preferably at least 74% in weight of sodium bicarbonate and at least 4%, preferably at least 6%, most preferably at least 8% in weight of trona insoluble impurities and at most 26%, preferably at most 20%, and most preferably at most 15% in weight of trona insoluble impurities.

The solid particles contain essentially the sodium bicarbonate part of the trona ore introduced in the leaching tank, whereas the produced solution contains its sodium carbonate part. The D50 diameter of the produced solid particles is preferably at least 10 μm, more preferably at least 15 μm, and most preferably at least 20 μm.

The solid particles are then separated from the production solution containing sodium carbonate. The separation can be done on any appropriate equipment. Without being limitative, the equipment can be chosen among: decanters, rotative filters, band filters, centrifuges and their combinations. The solid particles may be washed with fresh water to remove part of the production solution containing sodium carbonate. Such washing produces washing waters that can be recycled in the leaching tank.

The drying of the solid particles can be realized on any appropriate equipment. Advantageously the drying is operated in a fluid bed, a rotary dryer, a flash pneumatic conveyor dryer, or a gravity dryer. The final temperature of the solid particles exiting the dryer should be low enough to avoid thermal decomposition of sodium bicarbonate into sodium carbonate. In an advantageous mode, the drying of the solid particles is operated with a $CO_2$ enriched atmosphere. This enables to transform part of the dissolved sodium carbonate, present in production solution and impregnating the solid particles, into sodium bicarbonate.

In order to increase the sodium bicarbonate content of the solid particles, in a recommended embodiment, the solid particles are submitted to a magnetic separation in order to separate and eliminate from them part of the trona insoluble impurities.

In the process according to the invention, the produced solution has a high content in sodium carbonate, which allows to valorize thoroughly the trona ore.

In recommended embodiments, the produced solution comprises at least 120 g/kg, preferably 135 g/kg sodium carbonate.

Thanks to his high content in sodium carbonate, the produced solution can be used in many different applications.

In a preferred embodiment of the invention, at least part of the produced solution is introduced into a crystallizer, in order to produce sodium carbonate crystals. In this embodiment it is recommended that the process according to the invention be coupled to an existing sodium carbonate monohydrate plant, to take advantage of existing monohydrate crystallizers.

In this embodiment it is also recommended that the produced solution be debicarbonated before its introduction into the crystallizer, in order to further lower its bicarbonate content. This debicarbonation can be performed for instance by vapor stripping or preferably through pH adjustment, for instance by sodium or calcium hydroxide addition.

In another preferred embodiment of the process according to the invention, at least part of the produced solution is introduced into the less basic compartments of an electrodialyser comprising alternating less basic and more basic adjacent compartments separated from each other by cationic membranes, the more basic compartments being delimited by the anionic faces of bipolar membranes on one side and by the cationic membranes on the other side. A solution comprising sodium bicarbonate is then extracted from the less basic compartments of the electrodialyser, this solution being afterwards able to be cooled in order to produce a suspension comprising sodium bicarbonate crystals and the suspension being separated into valorized sodium bicarbonate crystals and a sodium bicarbonate mother liquor.

In this other preferred embodiment of the invention, the electrodialyser contains at least two types of compartments and two types of membranes, cationic and bipolar. In some embodiments it can contain additional types of compartments and anionic membranes.

A bipolar membrane is an ion exchange membrane comprising one cationic face—permeable for the cations and impermeable for the anions and an other anionic face—permeable for the anions and impermeable for the cations. Such membrane can be produced by the juxtaposition of two monopolar membranes. Under a sufficient electric field, and in aqueous solution, the only possible reaction is the splitting of water at the interface between the two monopolar membranes into $H^+$ and $OH^-$ which then cross respectively the cationic and anionic monopolar membrane and exit the membrane into the adjacent compartments. It is recommended that the bipolar membranes are produced by the process as described in the patent application WO 01/79335 in the name of SOLVAY, in particular as described in its claims. The electrodialyser comprises advantageously only two types of compartments and only cationic and bipolar membranes. In this case, the less basic and more basic compartments of the electrodialyser are separated by an alternation of cationic and bipolar membranes and each compartment is thus delimited on one side by a cationic membrane, and on the other side by a bipolar membrane.

In this other preferred embodiment of the process according to the invention, a first production solution comprising sodium carbonate is introduced into the less basic compartments of the electrodialyser. Due to the flux of $Na^+$ ions through the cationic membrane, at least part of the entering sodium carbonate is transformed into sodium bicarbonate, forming an output solution comprising sodium bicarbonate. Depending on the concentration in sodium carbonate of the first production solution, it can also happen, in advantageous embodiments, that sodium bicarbonate is converted into carbon dioxide at the output of the less basic compartments of the cell. Indeed, when all the sodium carbonate entering the less basic compartments has been transformed into sodium bicarbonate as a consequence of $Na^+$ ions passing the cationic membranes, any additional flux of $Na^+$ ions passing through those membranes has the consequence of destroying sodium bicarbonate into $CO_2$ and water. The carbon dioxide can then be extracted from the cell and reacted with sodium carbonate solutions at other stages of the process in order to produce crystals of sodium bicarbonate. For instance, the generated $CO_2$ gas can advantageously be used to react with a sodium carbonate solution in order to produce sodium bicarbonate crystals. This reaction can be performed in gas-liquid contactors suitable for the carbonation of sodium carbonate solutions. Depending on the circumstances, the sodium carbonate solution can be first concentrated by any suitable means, before its carbonation.

In a recommended variant of this preferred embodiment, a solution comprising sodium carbonate and sodium bicarbonate is introduced into the more basic compartments of the electrodialyser. The produced solution of the process according to the invention can advantageously be used to constitute this solution. A solution comprising sodium hydroxide is then produced into the more basic compartments, by combination of the flux of sodium ions crossing the cationic membrane and the flux of hydroxyl ions crossing the anionic face of the bipolar membranes. A solution enriched in sodium carbonate is finally extracted from the more basic compartments, thanks to the reaction of sodium bicarbonate with the sodium hydroxide.

The annexed figures serve to illustrate the invention.

Figure 1:
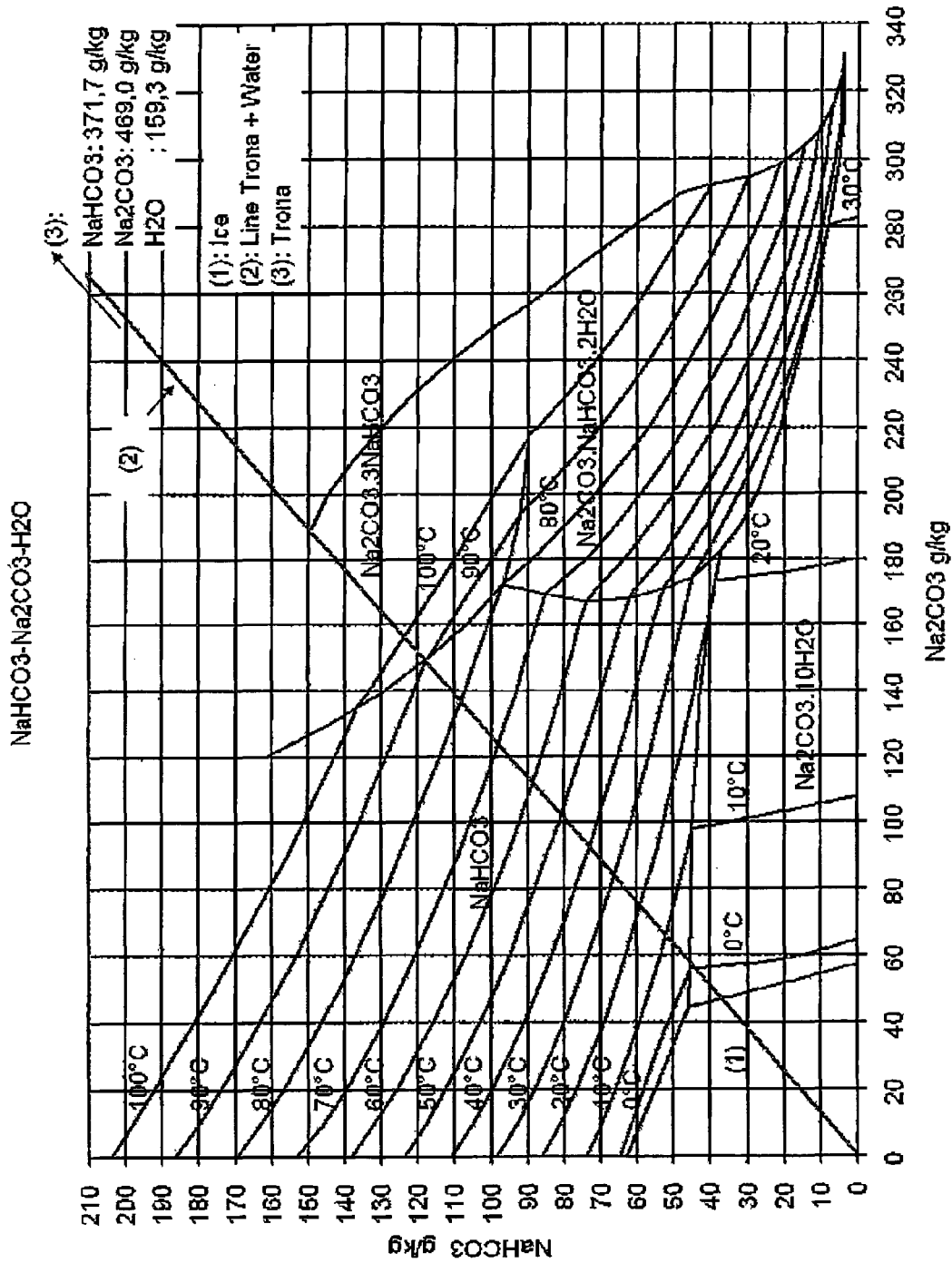
FIG. 1 is a solubility diagram of sodium carbonate-sodium bicarbonate in water.
Figure 2:
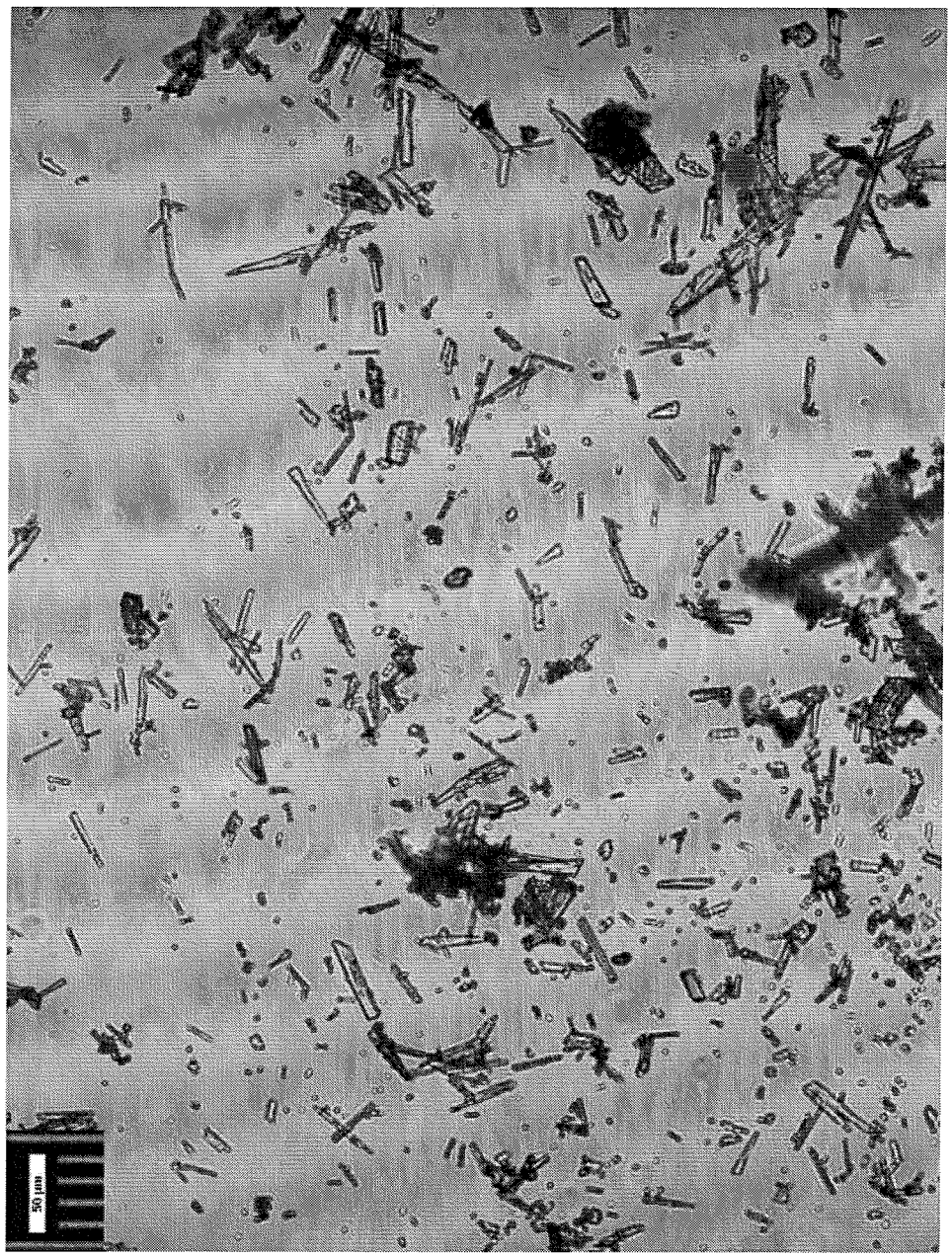
FIG. 2 is a microscope photograph showing the structure of the solid particles produced in the process according to the invention (example 10).

Details and particularities of the invention will appear from the description of the following examples.

EXAMPLES 1-2

In the first two examples, the process according to the invention was operated in a discontinuous way.

Example 1

A quantity of 500 g of trona T200® (whose characteristics are given in table 1), produced by SOLVAY CHEMICALS, Inc. was introduced and dissolved into a thermally conditioned leaching tank containing 1.5 l of a dissolution solution comprising sodium carbonate and sodium bicarbonate, saturated in sodium bicarbonate. The composition of the dissolution solution is given in table 2. The tank was stirred by a 6-blades mixer rotating at 650 rpm, and was maintained at a temperature of 30° C. After a dissolution time of 30 minutes, during which solid particles containing crystals of sodium bicarbonate were precipitated, the content of the tank was filtered in order to separate the solid particles from the mother liquor. A dissolution rate was calculated, according to the following formula:

$$\text{Dissolution rate } (\%) = \frac{M_f - M_{EMi}}{M_{Ti}} \times 100,$$

where $M_f$ is the final sodium carbonate mass in the leaching tank, $M_{EMi}$ is the initial sodium carbonate mass in the leaching tank and $M_{Ti}$ is the mass of sodium carbonate in the trona introduced in the leaching tank. A quantity of 100% was obtained. Composition of the produced solution is given in table 2 and analysis of the solid particles is given in table 3. Finally, extraction water was added in order to bring the composition of the produced solution back to the composition of the dissolution solution, for the next batch production.

Example 2

In example 2 it was performed as in example 1, except that the trona T200 was replaced by crushed trona, suitable for the feeding of calciners in the monohydrate process and sieved between 1 and 1.9 mm. This particular range of particle sizes contains a lot of insoluble impurities, as reflected by its low alkali content, given in table 1. This composition has an impact on the composition of the produced solid particles. Results of example 2 are given in tables 2 and 3. The dissolution rate was 96.6%.

TABLE 1

| Trona type | $Na_2CO_3$ (g/kg) ① | $NaHCO_3$ (g/kg) ② | Trona (g/kg) (①+②) | NaCl (g/kg) | Insolubles (g/kg) | Granulometry (laser) | | | |
|---|---|---|---|---|---|---|---|---|---|
| | | | | | | D10 μm | D50 μm | D90 μm | span |
| T200 | 467 | 350 | 972 | 0.2 | 20 | 7 | 46 | 208 | 4.3 |
| Crushed and sieved 1.0 < Ø < 1.9 mm | 376 | 276 | 775 | 7.9 | 210 | / | / | / | / |

TABLE 2

| Exemple | Trona | Residence time (min) | Dissolution solution | | Produced solution | | dissolution rate of |
|---|---|---|---|---|---|---|---|
| | | | $Na_2CO_3$ (g/kg) | $NaHCO_3$ (g/kg) | $Na_2CO_3$ (g/kg) | $NaHCO_3$ (g/kg) | $Na_2CO_3$ (%) |
| 1 | T200 | 30 | 6.4 | 93 | 135 | 59 | 100 |
| 2 | 1.0 < Ø < 1.9 mm | | 9.0 | 88 | 110 | 65 | 96.6 |

TABLE 3

| Example | Trona | Filtered solid particles | | | | | Laser Granulometry | | | |
|---|---|---|---|---|---|---|---|---|---|---|
| | | $Na_2CO_3$ (g/kg) | $NaHCO_3$ (g/kg) | Insolubles (g/kg) | Humidity (g/kg) | NaCl (g/kg) | D10 (μm) | D50 (μm) | D90 (μm) | Span |
| 1 | T200 | 110 | 814 | 39 | 37 | 0.4 | 1 | 7 | 58 | 7.9 |
| 2 | 1.0 < Ø < 1.9 mm | 109 | 476 | 336 | 68 | 11 | 9 | 922 | 2118 | 2.3 |

In the next examples 3-16, the process according to the invention was operated in a continuous way. Trona was fed into a stirred leaching tank, thermally conditioned, through a K-TRON metering system. Two types of trona from SOLVAY CHEMICALS, Inc. were used, which are labeled: "T50", and "calciner feed <4 mm". The characteristics of those products are given in table 4.

TABLE 4

| | Laser granulometry | | | | composition | | | |
|---|---|---|---|---|---|---|---|---|
| | d10 (μm) | d50 (μm) | d90 (μm) | span | $Na_2CO_3$ (g/kg) | $NaHCO_3$ (g/kg) | Sesqui (g/kg) | Insolubles (g/kg) |
| T50 | 200 | 827 | 1906 | 2.1 | 451 | 335 | 935 | 52 |
| c.f. <4 mm | 49 | 678 | 3074 | 4.5 | 451 | 338 | 938 | 52 |

In these continuous embodiments of process according to the invention, the compositions of the dissolution and production solutions are identical. Extraction water from a feed tank is also continuously added to the leaching tank through a metering pump.

EXAMPLES 3-8

In examples 3 to 8, water originating from the condensates of the crystallizer of a monohydrate process for the production of sodium carbonate was used as extraction water. Trona used was T50. In those examples, temperature and residence time was varied:

| Example | Temperature (° C.) | Residence time (min.) |
|---|---|---|
| 3 | 20 | 15 |
| 4 | 20 | 60 |
| 5 | 30 | 15 |
| 6 | 30 | 60 |
| 7 | 45 | 15 |
| 8 | 45 | 60 |

The process being continuous, the compositions of the dissolution solution and of the production solution are identical. The measured values are given in table 5, as well as the composition and granulometry of the solid particles, after washing in ethanol and drying in air. The dissolution rate was calculated as:

$$\text{dissolution rate} = \frac{[CO_3^{2-}]_{Producedsolution} \times Q_{Producedsolution} - [CO_3^{2-}]_{Extraction\ water} \times Q_{Extraction\ water}}{[CO_3^{2-}]_{Trona} \times Q_{Trona}} \times 100$$

where
$[CO_3^{2-}]_{Extraction\ water}$ is the concentration of carbonate in the extraction water
$Q_{Extraction\ water}$ is the flow rate of the extraction water
$[CO_3^{2-}]_{Produced\ solution}$ is the concentration of carbonate in the produced solution
$Q_{Produced\ solution}$ is the flow rate of the produced solution
$[CO_3^{2-}]_{Trona}$ is the concentration of carbonate in the trona
$Q_{Trona}$ is the flow rate of the trona.

It can be observed that at 20° C., an increasing of residence time from 15 minutes (example 3) to 60 minutes (example 4) does not enable to increase the particle size of the solid particles: D10, D50 or D90 are almost unchanged.

But at 30° C. and 45° C. the solid particles sizes are significantly increased when the residence time is increased from 15 minutes (examples 5 and 7) to 60 minutes (examples 6 and 8). An increased factor of 1.6 to 2.0 on size diameter (D10, D50 or D90), increases the volume size of particles of a factor at power 3, so an increase factor of the volume of solid particles of 4 to 8.

TABLE 5

Dissolution in water of Trona T50

| | | Extraction water | | | $H_2O$ | | | |
|---|---|---|---|---|---|---|---|---|
| Leaching tank temperature | (° C.) | 20 | 20 | 30 | 30 | 45 | 45 |
| Residence time | (min) | 15 | 60 | 15 | 60 | 15 | 60 |
| | Example n° | 3 | 4 | 5 | 6 | 7 | 8 |
| Composition of the extraction water | $Na_2CO_3$ (g/kg) | 0 | 0 | 0 | 0 | 0 | 0 |
| | $NaHCO_3$ (g/kg) | 0 | 0 | 0 | 0 | 0 | 0 |
| | $H_2O$ (g/kg) | 1000 | 1000 | 1000 | 1000 | 1000 | 1000 |
| Composition of the production solution | $Na_2CO_3$ (g/kg) | 127 | 130 | 128 | 125 | 129 | 131 |
| | $NaHCO_3$ (g/kg) | 56 | 54 | 64 | 62 | 74 | 74 |
| | $H_2O$ (g/kg) | 817 | 816 | 808 | 813 | 797 | 795 |
| Feed rates | Extraction water (g/h) | 4329 | 1098 | 4232 | 1071 | 4230 | 1086 |
| | Trona (g/h) | 1781 | 467 | 1754 | 447 | 1780 | 448 |
| Feed rates ratio | Extraction water/Trona (kg/kg) | 2.4 | 2.4 | 2.4 | 2.4 | 2.4 | 2.4 |
| | Extraction water/Sodium Sesqui carbonate(kg/kg) | 2.6 | 2.5 | 2.6 | 2.6 | 2.5 | 2.6 |

TABLE 5-continued

| | | | Dissolution in water of Trona T50 | | | | | |
|---|---|---|---|---|---|---|---|---|
| Composition | $Na_2CO_3$ | g/kg | 108 | 53 | 83 | 58 | 52 | 43 |
| of the | $NaHCO_3$ | g/kg | 663 | 743 | 717 | 723 | 646 | 702 |
| solid | Insolubles | g/kg | 190 | 166 | 178 | 185 | 269 | 226 |
| particles | total | g/kg | 961 | 962 | 978 | 966 | 967 | 971 |
| Weight % of solid particles in the suspension | | % | 6.7 | 6.3 | 5.6 | 4.9 | 4.5 | 4.1 |
| Dissolution rate | | % | 92 | 93 | 94 | 92 | 95 | 98 |
| Laser granulometry | D10 | μm | 3 | 2 | 1 | 2 | 2 | 4 |
| of the solid particles | D50 | μm | 14 | 14 | 10 | 16 | 18 | 29 |
| | D90 | μm | 55 | 54 | 53 | 58 | 79 | 105 |
| | Span | / | 3.6 | 3.8 | 3.6 | 3.4 | 4.4 | 3.4 |

EXAMPLES 9-14

In examples 9 to 14, the extraction water which was utilized had a composition similar to a solution extracted from the less basic compartment of an electrodialyser, used according to particular embodiments of the invention. The trona used was T50. Two different ratios between the feed rates of extraction water and of trona were tested: 3.3 for examples 9 to 11 and 8.0 for examples 12 to 14. The other parameter which varied was the temperature. The measured compositions of the extraction waters, produced solution and solid particles (after washing in ethanol and drying in air) are given in table 6 as well as the granulometry of the solid particles.

It can be observed in table 6, that a reduced feed rate ratio of extraction waters to sodium sesquicarbonate from trona from 8 kg/kg (examples 12 to 14) to about 3 kg/kg (examples 9 to 11) increases the solid particle sizes:
- at 30° C. the D50 is increased from 14 μm (example 13) to 17 μm (example 10), D90 is increased from 52 (example 13) to 72 μm (example 10).
- at 45° C. the D50 is increased from 11 μm (example 14) to 17 μm (example 11), D90 is increased from 48 μm (example 14) to 126 μm (example 11).

EXAMPLES 15-16

In examples 15 and 16, it was performed as in examples 9-14, except that the trona which was dissolved was "calciner feed <4 mm". Two extraction water/trona feeding ratios were tested. The results are given on table 7.

TABLE 7

| dissolution of Trona Calciner Feed < 4 mm | | | | |
|---|---|---|---|---|
| Leaching tank temperature | | ° C. | 30 | 30 |
| Residence time | | min | 15 | 15 |
| Example no | | | 17 | 18 |
| Extraction water composition | $Na_2CO_3$ | g/kg | 30 | 27 |
| | $NaHCO_3$ | g/kg | 75 | 79 |
| | $H_2O$ | g/kg | 895 | 894 |
| Produced solution composition | $Na_2CO_3$ | g/kg | 118 | 72 |
| | $NaHCO_3$ | g/kg | 65 | 83 |
| | $H_2O$ | g/kg | 817 | 845 |
| Feed rates | Extr. Wat. | g/h | 8904 | 17832 |
| | Trona | g/h | 2850 | 2349 |
| | Ratio | | 3.3 | 8.1 |

TABLE 6

| dissolution of T50 with extraction water containing Na2CO3/NaHCO3 | | | | | | | | |
|---|---|---|---|---|---|---|---|---|
| Extraction water | | | | | | $H_2O$ | | |
| Leaching tank temperature | | (° C.) | 20 | 30 | 45 | 20 | 30 | 45 |
| Residence time | | (min) | 15 | 15 | 15 | 15 | 15 | 15 |
| | Example n° | | 9 | 10 | 11 | 12 | 13 | 14 |
| Composition | $Na_2CO_3$ | (g/kg) | 30 | 29 | 30 | 32 | 34 | 36 |
| of the | $NaHCO_3$ | (g/kg) | 76 | 79 | 74 | 80 | 74 | 72 |
| extraction water | $H_2O$ | (g/kg) | 894 | 892 | 896 | 888 | 892 | 892 |
| Composition | $Na_2CO_3$ | (g/kg) | 141 | 138 | 144 | 80 | 78 | 85 |
| of the | $NaHCO_3$ | (g/kg) | 53 | 58 | 66 | 67 | 75 | 88 |
| production solution | $H_2O$ | (g/kg) | 806 | 804 | 790 | 853 | 847 | 827 |
| Feed rates | Extraction water | (g/h) | 4500 | 4423 | 4528 | 5337 | 5251 | 5251 |
| | Trona | (g/h) | 1498 | 1508 | 1481 | 716 | 709 | 709 |
| | Feed rates ratio | Extraction water/Trona (kg/kg) | 3.0 | 2.9 | 3.1 | 7.5 | 7.4 | 7.4 |
| | | Extraction water/Sodium Sesqui carbonate(kg/kg) | 3.2 | 3.1 | 3.3 | 8.0 | 7.9 | 7.9 |
| Weight % of solid particles in the suspension | | % | 15.4 | 14.9 | 11.6 | 5.2 | 5.3 | 3.1 |
| Dissolution rate | | % | 88 | 87 | 97 | 91 | 92 | 98 |
| Laser granulometry | D10 | μm | 3 | 3 | 2 | 3 | 2 | 1 |
| of solid particles | D50 | μm | 18 | 17 | 17 | 15 | 14 | 11 |
| | D90 | μm | 71 | 72 | 126 | 46 | 52 | 48 |
| | Span | / | 3.8 | 4.1 | 7.3 | 2.9 | 3.6 | 4.3 |

TABLE 7-continued

| dissolution of Trona Calciner Feed < 4 mm | | | | |
|---|---|---|---|---|
| Solid particles composition | Na₂CO₃ | g/kg | 172 | 168 |
| | NaHCO₃ | g/kg | 685 | 667 |
| | Insolubles | g/kg | 92 | 113 |
| | total | g/kg | 949 | 948 |
| Weight % of solid particles in the suspension | | % | 13.6 | 5.7 |
| Dissolution rate | | % | 74 | 86 |
| Laser granulometry of solid particles | d10 | μm | 3 | 3 |
| | d50 | μm | 18 | 23 |
| | d90 | μm | 57 | 69 |
| | Span | | 2.9 | 2.9 |

EXAMPLE 17

Figure 3:
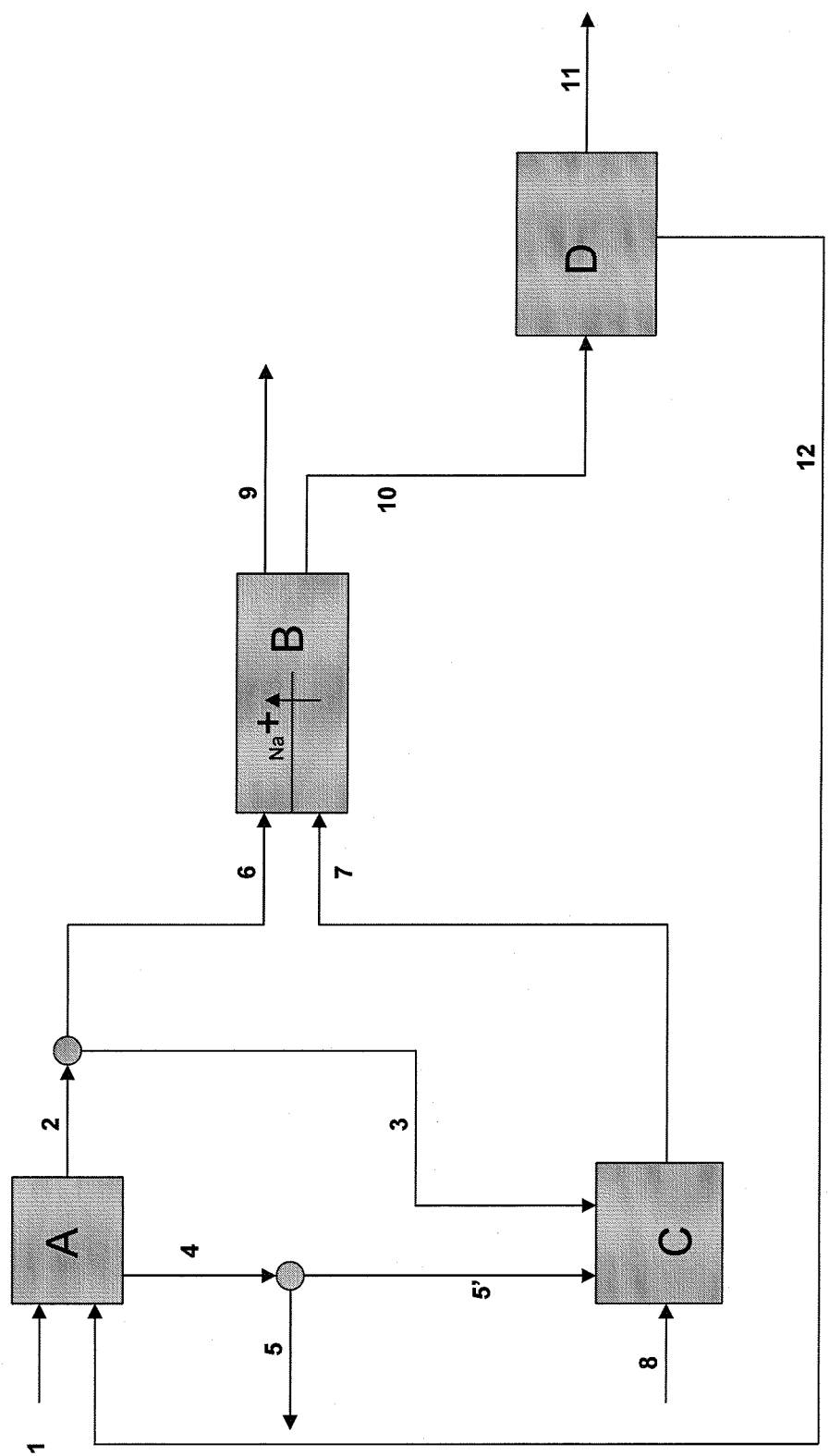
FIG. 3 illustrates a particular embodiment of the invention, described in example 17.

In example 17, the process illustrated in FIG. 3 is performed. A quantity of 1000 kg/h of trona (1) is introduced into a first leaching tank (A), together with 3310 kg/h of a recycle water (12) coming from crystalliser (D). The recycle water (12) contains 22 g/kg Na2CO3 and 87 g/kg NaHCO3. Its temperature is 30° C. A quantity of 486 kg/h of solid particles (4) and 3824 kg/h of a produced solution (2) are taken out of the tank. The produced solution (2) contains 136 g/kg Na2CO3 and 54 g/kg NaHCO3. A portion (5) of 243 kg/h of the solid particles is directly valorized for flue gas treatment. The remaining part (5') is introduced into a second leaching tank (C), together with 1690 kg/h of fresh water (8) and a part (3) of 1563 kg/h taken from produced solution (2). A solution (7) containing 64 g/kg of Na2CO3 and 89 g/kg of NaHCO3 is introduced at a flow rate of 3496 kg/h into the less basic compartments of a two compartments electrodialyser (B), together with the remaining part (6) of flow (2) which is introduced into the more basic compartments. The electrodialyser (B) comprises NEOSEPTA BP-1E bipolar membranes produced by ASTOM and NAFION® cationic membranes produced by DuPont. A solution (9) comprising 200 g/kg of sodium carbonate and essentially no bicarbonate is extracted at a temperature of 60° C. and at a flow rate of 2261 kg/h from the more basic compartments. It is valorized in a conventional monohydrate plant. A solution (10) containing 125 g/kg sodium bicarbonate and 22 g/kg sodium carbonate at a temperature of 60° C. is extracted at a flow rate of 3452 kg/h from the less basic compartments and introduced into a crystallizer (D) where 142 kg/h of sodium bicarbonate crystals are produced. Mother liquor (12) of the crystallization constitutes the recycle water.

EXAMPLE 18-21

In examples 18 to 21, trona from SOLVAY CHEMICALS, Inc. "calciner feed" was used (whose characteristics are given in table 8).

Crushed Trona was introduced continuously in a two stages leaching unit. The two stages leaching unit comprised a crushed trona weight flow regulated feeder; two similar leaching tanks of 100 Liters useful volume each, stirred homogeneously with blades stirrers at a speed of 280 rpm, and arranged in battery in series; a heat exchanger to regulate the temperature of the extraction water.

The first leaching tank was fed continuously with the trona and the heated extraction water. The targeted weight ratio between the feed rates of extraction water and sodium sesquicarbonate from trona was set at 2.8 kg/kg.

The outflow of the first leaching tank was fed to the second leaching tank. Levels of each leaching tanks were regulated in order to maintain a mean residence time of the dissolution solution and solid particles of 20 or 40 minutes in each tank. The mean residence time is defined as the ratio of the useful volume of the tank divided by the volumic outflow of the dissolution solution and solid particles. Operating conditions were maintained during a time sufficient to install a continuous regime in the leaching tanks, checked by regular sampling and analysis of the content of the tanks.

Details of operating conditions (flow rates, temperatures, and corresponding residence times) and results (chemical analysis of the solutions and final solids, calculated dissolution rates, and laser particles sizes granulometry of the final solid) are listed in table 9. Dissolution rates are calculated with the same formula in examples 3 to 8. The solid recovery in the table is the ratio between the weight of the final solid recovered and the weight of the initial trona introduced.

TABLE 8

| Average composition of used crushed trona "calciner feed" | |
|---|---|
| Characteristics | Average value |
| Sodium sesquicarbonate content on Humid trona (%) | 93.1 |
| Free moisture (%) | 0.8 |
| NaCl (g/kg) | 0.9 |
| Insolubles (g/kg) | 68 |
| Total Soluble Organic Content (mg/kg trona) | 710 |
| Sieves granulometry d90 (mm) and standard deviation (mm) | 7.6 +/− 0.7 |
| Sieves granulometry d50 (mm) and standard deviation (mm) | 2.5 +/− 0.8 |
| Sieves granulometry d10 (mm) and standard deviation (mm) | 0.10 +/− 0.07 |

TABLE 9

| Dissolution in water of trona calciner feed | | | | | | |
|---|---|---|---|---|---|---|
| | | | | Example n° | | |
| | | | 18 | 19 | 20 | 21 |
| Operating conditions | Temperature | ° C. | 30 | 30 | 20 | 45 |
| | Residence time in first tank | min | 20 | 40 | 40 | 40 |
| | Residence time in second tank | min | 20 | 40 | 40 | 40 |
| | Extraction water feed rate | kg/h | 104 | 54 | 53 | 58 |
| | Trona feed rate | kg/h | 276 | 140 | 139 | 139 |
| | Feed rates ratio | kg/kg | 2.8 | 2.7 | 2.7 | 2.7 |
| Extraction water composition | NaHCO₃ | g/kg | 0 | 0 | 0 | 0 |
| | Na₂CO₃ | g/kg | 0 | 0 | 0 | 0 |
| | H₂O | g/kg | 1000 | 1000 | 1000 | 1000 |

TABLE 9-continued

Dissolution in water of trona calciner feed

|  |  |  | Example n° | | | |
| --- | --- | --- | --- | --- | --- | --- |
|  |  |  | 18 | 19 | 20 | 21 |
| Produced solution composition out of second tank | NaHCO$_3$ | g/kg | 61 | 58 | 52 | 65 |
|  | Na$_2$CO$_3$ | g/kg | 123 | 130 | 129 | 135 |
|  | H$_2$O | g/kg | 816 | 812 | 819 | 800 |
| Dissolution rate | Out of first tank | % | 84 | 89 | 81 | 93 |
|  | Out of second tank | % | 95 | 97 | 95 | 99 |
| Final solid out of second tank | Solid recovery | kg/kg trona | 0.12 | 0.34 | 0.25 | 0.24 |
|  | Weight % of solid particles in the suspension | % | 4.8 | 5.1 | 6.0 | 4.7 |
| Final solid composition out of second tank | NaHCO$_3$ | g/kg | 830 | 744 | 851 | 808 |
|  | Na$_2$CO$_3$ | g/kg | 23 | 36 | 27 | 72 |
|  | Insolubles | g/kg | 147 | 213 | 122 | 112 |
| Laser granulometry | D$_{10}$ | μm | 1 | 2 | 1 | 4 |
|  | D$_{50}$ | μm | 8 | 15 | 7 | 38 |
|  | D$_{90}$ | μm | 37 | 52 | 38 | 102 |
|  | span | — | — | 4 | 3 | 5 | 3 |

The invention claimed is:

1. A process for separate valorization of sodium carbonate and sodium bicarbonate out of trona, comprising:
   introducing and dissolving crushed trona ore in a stirred leaching tank containing a dissolution solution comprising sodium carbonate and sodium bicarbonate, saturated in sodium bicarbonate, to produce solid particles suspended in a production solution comprising sodium carbonate, the solid particles containing at least 4% by weight of insoluble trona impurities and at least 65% in weight of sodium bicarbonate, wherein the temperature of said dissolution solution and of said production solution is at least 25° C.;
   separating the solid particles from the production solution containing sodium carbonate;
   drying and valorizing the separated solid particles;
   taking out at least part of the production solution containing sodium carbonate from the leaching tank to constitute a produced solution, said produced solution being valorized separately; and
   introducing an extraction water in the leaching tank, wherein the extraction water is pure fresh water or water comprising from 10 to 35 g/kg of sodium carbonate and/or from 70 to 100 g/kg of sodium bicarbonate.

2. The process according to claim 1, wherein said extraction water is introduced in the leaching tank with a weight ratio of said extraction water to sodium sesquicarbonate of the trona being at most 3.5.

3. The process according to claim 1, wherein the produced solution comprises at least 120 g/kg of sodium carbonate.

4. The process according to claim 1, wherein the solid particles contain at least 70% in weight of sodium bicarbonate.

5. The process according to claim 1, wherein the solid particles have a mean diameter D50 of at least 10 μm.

6. The process according to claim 1, wherein the solid particles have a mean diameter D50 of at most 38 μm.

7. The process according to claim 1, further comprising submitting the solid particles to a magnetic separation to separate and eliminate from them at least part of the insoluble trona impurities.

8. The process according to claim 1, wherein at least part of the produced solution is debicarbonated and introduced into a crystallizer to produce sodium carbonate crystals.

9. The process according to claim 1, further comprising:
   introducing at least part of the produced solution into less basic compartments of an electrodialyser comprising alternating less basic and more basic adjacent compartments separated from each other by cationic membranes, the more basic compartments being delimited by anionic faces of bipolar membranes on one side and by cationic membranes on the other side; and
   generating and extracting a solution comprising sodium bicarbonate from the less basic compartments of the electrodialyser, wherein this solution is afterwards cooled to produce a suspension comprising sodium bicarbonate crystals, and wherein the suspension is separated into valorized sodium bicarbonate crystals and a sodium bicarbonate mother liquor.

10. The process according to claim 9, further comprising:
    introducing water into the more basic compartments of the electrodialyser;
    producing a solution comprising sodium hydroxide into the more basic compartments, by combination of flux of sodium ions crossing the cationic membranes and flux of hydroxyl ions crossing the anionic faces of the bipolar membranes; and
    extracting a solution comprising sodium hydroxide from the more basic compartments.

11. The process according to claim 10, further comprising:
    introducing a solution comprising sodium carbonate and sodium bicarbonate into the more basic compartments of the electrodialyser;
    producing a solution comprising sodium hydroxide into the more basic compartments, by combination of the flux of sodium ions crossing the cationic membranes and the flux of hydroxyl ions crossing the anionic faces of the bipolar membranes; and
    extracting a solution enriched in sodium carbonate from the more basic compartments.

12. The process according to claim 1, further comprising:
    introducing at least part of the produced solution into less basic compartments of an electrodialyser comprising alternating less basic and more basic adjacent compartments separated from each other by cationic membranes, the more basic compartments being delimited by anionic faces of bipolar membranes on one side and by cationic membranes on the other side;

decomposing at least part of the sodium bicarbonate contained in the less basic compartments of the electrodialyser into carbon dioxide and water; and extracting carbon dioxide and a solution comprising water from the less basic compartments of the electrodialyser.

13. The process according to claim 8, wherein the crystallizer is a monohydrate sodium carbonate crystallizer.

14. The process according to claim 1, wherein the solid particles comprise at least 6% by weight of insoluble trona impurities.

15. The process according to claim 1, wherein the solid particles contain at least 74% in weight of sodium bicarbonate.

16. A process for separate valorization of sodium carbonate and sodium bicarbonate out of trona, comprising:

introducing and dissolving crushed trona ore in a stirred leaching tank containing a dissolution solution comprising sodium carbonate and sodium bicarbonate, saturated in sodium bicarbonate, to produce solid particles suspended in a production solution comprising sodium carbonate, the solid particles containing at least 4% by weight of insoluble trona impurities and at least 65% in weight of sodium bicarbonate;

separating the solid particles from the production solution containing sodium carbonate;

drying and valorizing the separated solid particles;

taking out at least part of the production solution containing sodium carbonate from the leaching tank to constitute a produced solution, said produced solution being valorized separately; and introducing an extraction water in the leaching tank, with a weight ratio of said extraction water to sodium sesquicarbonate of the trona of at most 3.5.

* * * * *